US00RE35730E

United States Patent [19]

Reynolds

[11] E Patent Number: Re. 35,730

[45] Reissued Date of Patent: Feb. 17, 1998

[54] APPARATUS AND PROCESS TO REGENERATE A TRIVALENT CHROMIUM BATH

[75] Inventor: Bradley David Reynolds, Burlington, Canada

[73] Assignee: Elf Atochem North America, Inc., Philadelphia, Pa.

[21] Appl. No.: 566,593

[22] Filed: Dec. 4, 1995

Related U.S. Patent Documents

Reissue of:

[64] Patent No.: 5,269,905
Issued: Dec. 14, 1993
Appl. No.: 741,979
Filed: Aug. 6, 1991

U.S. Applications:

[63] Continuation of Ser. No. 231,596, Jan. 13, 1994, abandoned, which is a continuation of Ser. No. 516,486, Apr. 30, 1990, abandoned.

[51] Int. Cl.[6] ..... C25D 3/06; C01G 37/00; B01J 39/00

[52] U.S. Cl. ..... 205/101; 205/99; 205/287; 204/DIG. 13

[58] Field of Search ..... 205/99, 101, 287; 204/DIG. 13

[56] References Cited

U.S. PATENT DOCUMENTS

| | | | |
|---|---|---|---|
| 2,733,204 | 1/1956 | Costa | 210/24 |
| 3,475,163 | 10/1969 | Watson, Jr. et al. | 75/101 |
| 3,658,470 | 4/1972 | Zievers et al. | 23/145 |
| 3,661,732 | 5/1972 | Withrow | 204/51 |
| 3,903,237 | 9/1975 | Smith et al. | 423/54 |
| 3,909,372 | 9/1975 | Fujii | 204/51 |
| 3,998,924 | 12/1976 | Jones et al. | 423/7 |
| 4,031,038 | 6/1977 | Grinstead et al. | 260/2.2 R |
| 4,038,160 | 7/1977 | Crowther et al. | 204/57 |
| 4,432,843 | 2/1984 | Tremmel | 204/51 |
| 4,448,649 | 5/1984 | Barclay et al. | 204/51 |
| 4,702,838 | 10/1987 | Babcock et al. | 210/638 |
| 4,963,264 | 10/1990 | Davis | 210/638 |
| 5,002,645 | 3/1991 | Eastland, Jr. et al. | 204/157.42 |
| 5,178,746 | 1/1993 | Darnall et al. | 205/287 |

FOREIGN PATENT DOCUMENTS 0130855 11/1978 Japan .

OTHER PUBLICATIONS

Chemical Abstracts, vol. 106, 202414f, *1987, [Grigor'eva et al.]

*Primary Examiner*—Arun S. Phasge
*Attorney, Agent, or Firm*—Finnegan, Henderson, Farabow, Garrett and Dunner, L.L.P.

[57] ABSTRACT

A process and apparatus for regenerating a plating bath comprising trivalent chromium cations (a trivalent chromium bath). The bath can be continuously, or more preferably, periodically with an ion exchange resin, preferably a cation exchange resin. A useful apparatus comprises a plating tank containing a trivalent chromium plating bath in communication with an ion exchange bed continuing ion exchange resin.

30 Claims, No Drawings

APPARATUS AND PROCESS TO REGENERATE A TRIVALENT CHROMIUM BATH

Matter enclosed in heavy brackets [ ] appears in the original patent but forms no part of this reissue specification; matter printed in italics indicates the additions made by reissue.

[This application is] *This application is a continuation of application Ser. No. 08/231,596,* filed Jan. 13, 1994, now abandoned, which is a reissue application of U.S. Pat. No. 5,269,905, issued Dec. 14, 1993; which is a continuation of application Ser. No. 07/516,486 filed Apr. 30, 1990, now abandoned.

FIELD OF THE INVENTION

The present invention is in the field of metal plating; more particularly, the present invention relates to process and apparatus for the regeneration of trivalent chromium bath.

DESCRIPTION OF RELATED ART

The electroplating, also known as electrodeposition, of chrome is well known. Brassard, Decorative Electroplating—A Process in Transition; Metal Finishing, pp. 105–108 June 1988, reviews the state of the art of chromium electroplating. Historically hexavalent chromium salt plating has been the prevailing process. More recently trivalent chromium salt solution electroplating has become popular.

Chrome plating based on hexavalent chrome has excellent hardness and wear resistance. Thick coatings can be attained and are applied for functional applications, such as the chrome plating of piston rings.

Chromium electroplating based on hexavalent chrome has many disadvantages, including the requirement of a high chromium metal concentration in solution; the high oxidation capability of the solution; the low efficiency of the electroplating process; copious hydrogen evolution and poor covering power; and the toxicity of the hexavalent chromium plating bath. Nevertheless, consumer demand for the finish and historical lack of viable alternatives have enabled hexvalent electroplating to be a commercially successful process.

Attempts have been made to deposit chromium from alternate electrolytes not based on hexavalent chemistry. However, these attempts have met with a variety of problems, predominantly electrochemical in nature. Chromium exists in the trivalent state in a variety of materials; however, deposition of chromium metal from electrolytes of these materials is problematic. One major problem is the relative ease of trivalent chromium oxidation to hexavalent chromium at the anode. Only small quantities of hexavalent chrome needs to be present in a trivalent electroplating bath to reduce the efficiency of the process significantly.

The trivalent chromium salt plating solutions have been used successfully as commercial applications. Typically, such solutions result in thinner coatings and have been used for decorative applications. A useful trivalent chromium bath is reviewed at page 107 of the Brassard Article. In this process the anode is separated from intimate contact with the plating solution by surrounding it in a box constructed of polypropylene.

The advantages of trivalent chromium systems, include lower toxicity, lower chromium metal concentration required in solution, better electrical efficiency and reduced current requirements, and less sensitivity to problems associated with hexavalent chromium solutions, such as high density burning and whitewash. Waste treatment of the chromium bath solution is greatly simplified by the lower concentration of chromium in the solution.

The increasing popularity of chromium plating using trivalent chromium salt solution is reviewed in the article Snyder, Focus, Chromium Plating, Trivalent; the Second Decade, Products Finishing, pages 56–65, March 1988. This article compares the hexavalent and trivalent chromium processes including operating conditions. Other articles of interest regarding chromium plating include, Turn to Trivalent, Product Finishing, pages 72–79, October, 1988; and Zaki, Chromium Plating, PF Directory, pages 146–160.

The Zaki article provides a review of hexavalent and trivalent type chromium plating processes. Included are chrome plate bath compositions. Zaki reports that more recent technology for trivalent chromium deposition utilizes anode boxes with selective membranes which separate the catholyte and anolyte solutions. The membranes prevent the trivalent chromium ions in the solution from reaching the anode and oxidizing to the hexavalent state. This approach has made it possible to utilize relatively simple bath formulations. Conventional lead-alloy anodes are used within the anode box. The mechanism provides for excellent pH stability during plating. The bath is capable of producing light colored deposits with color very close to that obtained from the hexavalent chromium bath.

The trivalent chromium solution utilizes a primary additive containing the trivalent chromium ion and secondary additives which contain gram refiners and lighteners. The bath typically operates at from 45°–55° C. (113°–131° F.) and contains a relatively low concentration of chromium metal (i.e., about 6 grams per liter).

Trivalent chromium metal (as with hexavalent chroming plating) plating even with state of the art processing results in the bath being contaminated with metallic impurities which primarily include nickel, hexavalent chromium, copper and zinc cations. Nickel tends to darken the deposit; copper tends to cause darkness at high current density; and zinc tends to form white bloom at low current density. Hexavalent chromium, as an impurity, causes defects at low current densities. The presence of hexavalent chrome is readily apparent by a uniformly darker color to the plated article; and additionally, the plating has good throw or covering which is expected from plating using a bath comprising hexavalent chromium cations. The maximum tolerable levels of cations are reported to be 500 milligrams per liter of nickel, 30 milligrams per liter of copper, 70 milligrams per liter of zinc and up to 300 milligrams per liter of hexavalent chrome.

Attempts are known to have been made to use ion exchange resins to selectively remove impurities from hexavalent chromium plating baths. Hexavalent chromium is typically provided as chromic acid ($CrO_3$). These materials have been found to readily oxidize the ion exchange resin. The resin, therefore could not be repeatedly be used. Where ion exchange resin has been used to regenerate hexavalent chromium plating baths, the baths had to be diluted before contact with the ion exchange resin to reduce the concentration of the chromic acid and prolong resin life. Before the dilute regenerated bath could be reused it had to be reconcentrated by suitable means such as evaporation. Ion exchange resins have also been used to remove hexavalent chromium cations from water used to rinse articles plated in chrome plating processes based on hexavalent chromium.

A continuing goal in using trivalent chrome baths is to regenerate and reuse the bath. This has been accomplished by processes such as those disclosed in U.S. Pat. No. 4,038,160, directed to a trivalent chromium electroplating bath which is treated with a sufficient amount of a water soluble ferrocyanide to restore the bath to normal working order. However, such processes result in the use of precipitants which form insoluble salts with the metallic impurity. This process has several disadvantages. The precipitate must be filtered out and/or a rinse must be done prior to chrome plating to remove any precipitant adhering to the parts. The precipitants should not be added to a tank while undergoing electrolysis, thus some down time is unavoidable. Ferrocyanide, as a cyanide, typically has a different pH than the bath solution (typically controlled to pH of about 2.7). Organic precipitants tend to be expensive, and can darken the plated deposit, especially if the precipitant contains sulphur containing compounds.

SUMMARY OF THE INVENTION

The present invention is directed to a process and apparatus for regenerating a plating bath comprising trivalent chromium cations (a trivalent chromium bath). The process comprises the step of contacting the bath continuously, or more preferably, periodically with an ion exchange resin, preferably a cation exchange resin.

The process of the present invention can selectively remove metallic impurities, including zinc, copper, nickel and iron cations, from a trivalent chromium bath. Additionally, the process of the present invention has been found to mitigate plating defects caused by the presence of hexavalent chromium cations. It is believed that the ion exchange resin can selectively remove hexavalent chromium cations from a trivalent chromium plating bath.

A useful apparatus comprises a plating tank containing a trivalent chromium plating bath in communication with an ion exchange bed containing ion exchange resin.

The method of the present invention has the advantage of not adding any substance to the plating bath. The ionic exchange resin is essentially insoluble, and therefore, no danger of over addition of a chemical exists. The chrome plating bath solution characteristics, such as pH and temperature, are not noticeably changed by passing through an ion exchange bed.

The ion exchange resin is substantially stable upon exposure to trivalent chromium plating bath. The resin can be repeatedly used to regenerate trivalent chromium plating bath without having to be treated or having to dilute the bath. The resin can be regenerated as needed to remove collected metal cations.

DETAILED DESCRIPTION OF THE PREFERRED EMBODIMENTS

The present invention is directed to an apparatus and process to regenerate a trivalent chromium salt bath comprising the step of contacting the bath with an ionic exchange resin.

The plating tank comprises a tank, which is preferably lined with a material which resists the chrome bath solution. Preferred liners include plastic or rubber such as poly(vinyl chloride) or a fluoropolymer. The plating tank comprises at least one anode and at least one cathode. The anode and cathode can hang from suitable hangers, such as anode hanger and cathode hanger, which are preferably titanium hangers. The anodes can be made of lead or graphite. High density round graphite anodes fitted on the titanium hanger are preferred. The cathode can be made of copper. Tank contains a chromium plating bath. The anode and cathode are preferably hung beneath the surface of chromium plating bath. The anode to cathode area ratio can be from 1:1 to 5:1, and preferably from 2:1 to 3:1. The anode should be adequate to provide a current capacity of at least 2.7 amps per square decimeter (ASD) (25 amps per square foot (ASF) and preferably, 4.3 to 10.8 ASD (40 to 100 ASF).

Operating conditions for trivalent chromium plating are presented by Snyder, page 60, supra. Useful and typical conditions include a chromium plating bath having a pH of from 1.0 to 5.0, and preferably 2.3 to 4.0, a temperature of 27°–50° C. (80°–120° F.), a current density at the cathode of 4.3 to 10.8 ASD (40–100 ASF) and mild air agitation, with the use of special graphite anodes in single cells, and lead anodes in an anode box in double cells. The chromium concentration in single cells is from 15–25 grams per liter, and from 5–10 grams per liter in double cells. Single cells are typically filtered only for solids, while double cells can be continuously filtered with carbon. The rectifier voltage is typically from 5 to 12 volts, and more preferably, from 7 to 12 volts.

In a preferred range of operation the plating solution has a pH of 2.4 to 2.9, a temperature of 32°–37° C. (90°–100° F.), and a specific gravity of 1.182 to 1.202 at 35° C. The cathode current density is 6–15 ASD (60–150 ASF), and the anode current density of 2.5–5 ASD (25–50 ASF); with mild air or mechanical agitation. The most preferred operating conditions are for the solution to have a pH of about 2.7, a temperature of about 35° C. (95° F.), a specific gravity of 1.192 measured at 35° C., and the cathode current density is preferably about 10 ASD (100 ASF), and the anode current density is about 4 ASD (40 ASF). Hydrochloric acid and ammonium hydroxide can be used to adjust the pH.

Articles to be plated are conductively attached to cathodes. A useful embodiment of the anode is one such as shown in Brassard, page 107, supra, which contains an anode in an anode compartment. The anode communicates through the anode compartment. At least a portion of compartment has an inner perforated sheet and outer perforated sheets and an ion exchange membrane, between the inner and outer perforated sheets. The anode compartment can contain an anolyte composition, which comprises an aqueous solution preferably containing an acid, such as sulfuric acid.

The composition of the plating bath can be any useful composition known in the art. A preferred composition contains suitable chromium salts, such as chromic sulfate or chromic chloride, as the source of the trivalent chromium cations. The chromium plating bath can also include ammonium chloride, sodium bromide, boric acid, and a wetting agent, such as sodium ethyl hexyl sulfate, and a source of iron (ferric) cations.

A chromium bath generally contains from about 300 to 400 grams per liter (of final plating solution) of the various salts, including 18 to 25 grams per liter of a trivalent chromium cation (in the form of a salt, such as $CrSO_4$), and 75 to 110 milliliters per liter of catalyst composition. The catalyst composition is an aqueous solution of ammonium carboxylate (15 to 45 gram/liter (g/l) of catalyst composition), sodium ethyl hexyl sulfate (0.5 to 2 g/l), and formaldehyde (0.1 to 1 g/l). A typical bath composition contains 325 to 375 grams per liter of a final plating solution of a composition comprising in weight percent, 30 to 40 percent $CrSO_4$, (33 percent basic), i.e., $Cr_2(OH)_2(SO_4)$ $_2Na_2SO_4xH_2O$ (as provided by British Chrome and Chemicals. Ltd.). 15 to 20 percent $H_3BO_4$; 15 to 20 percent NaBr and 25 to 35 percent $NH_4Cl$, and 100 milliliters per liter of the catalyst composition. There is preferably from 0.1 to 15 milliliters per liter (ml/l) of a soluble iron salt. A preferred iron salt is ferric chloride ($FeCl_3.6H_2O$) added as an aqueous solution of from 100 to 300 g/l, which is added at from 0.1 to 15 ml/l of plating solution.

A deterrent to a successful operation of a chromium plating tank is metallic impurities which enter the bath during operation. It is desirable to keep to a minimum metal cations, such as iron, nickel, coppers, zinc, lead and hexavalent chrome from entering the bath. However, inevitably during the period of time of operation a bath that impurities contaminate the bath by being dragged in from materials coming in, from attack on the equipment, and/or from dissolution of unprotected parts.

In accordance with the present invention an ion exchange column is provided to remove such impurities from chromium plating bath. The ion exchange column is connected to plating tank and communicates with chromium plating bath through tank outlet line. There can be suitable means to control the flow of solution from chromium plating tank to ion exchange column, such as valve means.

Chromium plating bath solution to be regenerated passes from tank through the ion exchange column where the solution contacts the resin and is regenerated. The regenerated solution exits an outlet from the ion exchange column through regenerate solution line. The regenerated solution can be sent to a suitable storage means holding tank or reservoir storage through line. Alternately, and preferably, the regenerated solution is recirculated to plating tank through recirculation line. There is a suitable recirculating means, such as pump, to recirculate the chromium plating bath solution. The flow rate through the ion exchange bed depends on factors including the size of the bed, and the composition of the solution.

The chromium plating bath solution can be continuously treated and recirculated. Preferably, the chromium solution is periodically treated. Periodic treatment enables better control of iron ($Fe^{+3}$) cations, since there is a preferred amount of ferric cations desired in the plating bath. Periodic turnovers of the solution from the tank through the column allow time to regenerate the resin in the column as necessary.

The use of the ion exchange column 12 enables a variety of metal cations including zinc, copper, nickel and iron (ferrous) to be removed from the plating solution. In order to properly and efficiently run the process, the ion regeneration should be controlled to maintain a desired amount of ferric cations in the bath, preferably 50 to 100 parts per million, and more preferably, 75 to 90 parts per million of ferric cations.

Ion exchange resin which can be used in the ion exchange bed, typically in an ion exchange column 12, is of the type known in the art. Preferred ion exchange resins are cationic selective ion exchange resins, and more preferably, cation ion exchange resins which are selective to bivalent metal ions. The resin when new or regenerated is in the hydrogen ($H^+$) or sodium ($Na^+$) ion form and is preferably kept under a slight covering of water or plating solution to prevent it from drying out. Preferably, the cation exchange resin is not selective to remove trivalent chrome ions, and at the same time displays an ability to mitigate the defects associated with the presence of hexavalent chrome. This latter advantage is believed due to the selective removal of hexavalent chromium cations from the plating solution by the resin while substantially not removing the trivalent chromium cations. A preferred and useful method to provide the resin is to coat it on beads.

A preferred ion exchange resin is a polystyrene based cationic exchange resin having weakly acidic functional groups which can form complexes with heavy metal cations. A useful and preferred resin is Lewatit TP-207 cation exchange resin manufactured by the Mobay Chemical Corp. This resin is a macroporous polystyrene based cation exchange resin which is reported to have iminodiacetate functional groups. The weakly acidic active groups form complexes with heavy metal ions. The macroporous structure of the resin facilitates access to the complex forming groups, thus accelerating the exchange process and simultaneously improving the stability of the resin. This resin is reviewed in the publication "Mobay, Product Information Lewatit TP 207" by the Mobay Chemical Corporation, hereby incorporated by reference. As provided, the resin is in the form of spherical macroporous beads charged with sodium ions having a screened rating of 0.3–1.2 millimeters and a bulk density of 700–800 grams per liter of moist resin. The moisture content is 45–50 percent $H_2O$. The operating capacity is reported to be about 50 grams of copper per liter of the hydrogen form of the resin (H-form). The total capacity is approximately 2.5 equivalents per liter. The capacity is reported to apply at a flow rate of 10 bed volumes per hour. Additionally, Mobay discloses pH values of the solution for removal of different metal cations including a pH of 4 to remove manganese, pH of 3 to remove iron, pH of 2.7 to remove zinc and cobalt, pH of 1.5 to remove nickel and a pH of 1.5 to remove copper. These values represent the typical lower limits at which removal becomes less efficient. However, conditions can vary in the presence of anions, such as chloride or sulfate. The resin can be regenerated by desorption of metals with acids such as sulfuric or hydrochloric acid.

Reference is made to Mark, Ed., Encyclopedia of Polymer Science and Engineering, Second Edition, Ion-Exchange Polymers, pp. 341–393, Wally-Interscience, New York (1987) for a review of ion exchange polymers. Ion exchange polymers or resins, useful in the present invention, can be in any suitable form through which the chromium plating bath can pass and exchange metal ions. The ion exchange resin, useful in the present invention, is classified as a cation exchange resin possessing a fixed negative charge on the matrix resin. Cations such as sodium or hydrogen are exchanged for the metal cations which are present in the solution to be treated. Cationic exchange resins include both strong acid and weak acid resins. Strong acid resins commonly contain sulfonic acid groups attached to a styrenic backbone. Typically, the ion exchange resins are loaded into a vessel, such as a column or tank, to form a resin bed through which a fluid to be treated passes. However, vessels designed for counter current operation can be used. These are reviewed in the Encyclopedia of Polymer Science and Engineering Article at pages 353–355. The properties of the ion exchange resins are detailed beginning at page 355.

The ion exchange resins particularly useful in the present invention include resins substantially selective to exchange divalent metal cations, including copper, zinc, nickel, iron ($Fe+^2$) and the like. The ion exchange resin is preferably relatively less selective for trivalent chromium cations compared to the selectivity to the removal divalent metal ions. The preferred ion exchange resins are believed to be selective for removal of hexavalent chromium cations, but relatively less selective for trivalent chromium cations. A review of the selectivity characteristics of ion exchange resins is presented in the Encyclopedia Article at page 363 to 365.

Where desired, the ion exchange column can contain a mixture of different resins selective for different ions; or layers of different resins which are selective to different cations. Preferably, only one resin is used for a simplified commercial operation in accordance with the process of the present invention. A double bed can be used where the one bed comprises a resin which can selectively remove divalent metal cations; and the second bed comprises a resin which can selectively remove hexavalent chromium cations. The resin of both beds is substantially not selective to trivalent chromium cations. A preferred resin is a styrenic based resin operated at conditions which are selective to the divalent metal ions and preferably hexavalent chromium. The strength of the acid or base formed between the functional group and the hydrogen ion will help to determine the extent of exchange with particular ions. The stronger the acid, the lower the selectivity. Other factors influencing selectivity include the degree of crosslinking particle size of the resin, the resin type, flow rate, and the temperature.

Operation can be at the same temperature conditions, i.e., 80°–120° F., as used in the chromium bath. Flow rates will depend on the size of the ion exchange column, type of resin, whether the process is periodic or continuous, and whether a storage reservoir is used.

The present invention provides many advantages over the known methods to regenerate chromium plating bath solutions. The most apparent is that the plating solution can be regenerated without having to deal with precipitated metal salts. The ion exchange column simply removes the undesirable metal cations from the system and permits the immediate reuse of the regenerated plating solution. Other advantages include the fact that the system can be controlled to permit a desired amount of ferric cations to remain by removing selectively undesirable cations such as zinc, nickel and copper.

Perhaps the most interesting and unexpected advantage of the present invention is the ability of the ion exchange resin to mitigate defects associated with the presence of hexavalent chromium cations. This is believed to result from selectively separating some of the hexavalent chromium cations from the solution while substantially unaffecting the trivalent chromium cations. Trivalent chromium plating solutions known to have hexavalent chromium cations were used to plate test panels. The panels plated well with a thick coating (i.e., good throw) which is expected from the presence of hexavalent chromium cations. However, the overall color of the plating was darker than when using a trivalent chromium plating bath without hexavalent chromium ions present. The solution was passed through an ion exchange bed (Lewatit TP-207) and used to plate sample panels. The panels plated well without the dark appearance and thicker coating associated with the presence of the hexavalent chromium cations.

Several examples are set forth below to illustrate the nature of the invention and the manner of carrying it out. Percents are by weight unless otherwise indicated. However, the invention should not be considered as being limited to the details thereof.

EXAMPLES

In all of the examples to follow, the ion exchange resin used was Lewatit, TP-207 produced by the Mobay Chemical Corporation and described above. Briefly, it is a macroporous, polystyrene based cationic exchange resin which has weakly acidic functional groups (reported to be iminodiacetate functional groups) The initial resin charge is with sodium ($Na^+$). The form is in spherical beads having a macroporous structure with a screen rating of 0.3–1.2 millimeters. The moisture content is 45–50 percent water and the bulk density of moist resin is 700–800 grams per liter. The operating capacity is up to approximately 50 grams of copper per liter (H-form). The total capacity is approximately 2.8 equivalents per liter.

The initial chromium plating bath solution had approximately the following composition, 5–15 percent chromium sulfate, 5–15 percent ammonium chloride, 5–15 percent sodium bromide, 5–10 percent boric acid, 1–5 percent ammonium formate, and 0.5–1.0 percent of sodium ethyl hexyl sulfate wetting agent. There was a small source of soluble iron (ferric chloride) ions. Percents are by weight of the plating bath solution with the balance being water.

A glass column 50 centimeters high and having a 22 millimeter inner diameter (ID) with stop cock at the bottom was held in a burrett stand. Approximately 100 cubic centimeters of cation exchange resin was initially fed into the column and had a depth of approximately 24 centimeters. The resin, as shipped, is in the sodium form. It was changed to the acid form with 200 milliliters of 6 percent sulfuric acid having been passed through it (2 bed volumes). The flow rate for this was 3–5 bed volumes per liter of resin per hour or 40 milliliters per hour. The column was then washed with distilled water (300 millimeters) for approximately 45 minutes.

EXAMPLE 1

A plating solution to be purified was doped with excess iron ion (i.e., 140 mg/liter of ferric ion supplied as ferric chloride) and additionally, for every liter of solution 1.131 grams nickel sulfate ($NiSO_4.6H_2O$); 0.236 grams of copper sulfate ($CuSO_4.H_2O$); and 0.436 grams zinc sulfate ($ZnSO_4.7H_2O$). This is considered a doped solution.

The solution was treated at a rate of 4 bed volumes per hour through the column which equals 70 milliliters per 10 minutes. Some dilution occurred during the first run through the column since the column could not be completely drained of water. The water was above the level of the resin to prevent the resin from drying out. The following Table summarizes the results based on atomic absorption tests (A.A). Results are recorded in parts per million of the metal cation.

TABLE I

| CATION | INITIAL CONC. (PPM) | TREATED CONC. (PPM) |
|---|---|---|
| Cu | 55 | 0.2 |
| Zn | 99 | 1.2 |
| Fe | 140 | 53 |
| Ni | 230 | 2.0 |
| Cr | 18500 | 12500 |

A first nickel plated steel panel 76×102 mm (3×4 inches) was chrome plated at 5 amps, for three minutes in a 534 milliliter Hull cell using the regenerated solution as a chromium plating bath. The plate was oriented with the 102 mm long side horizontal. The appearance of the treated panel was very similar in color to a plated panel using an uncontaminated trivalent chromium plating bath. However, at 60–80 millimeters from the side closest to the anode (the high current density side) there was a light vertical band which appeared to be thin chromium coverage. There was a dark spot at 60 millimeters from the high current density side on the plate.

A second panel was plated at the same conditions except that trivalent chromium (22 g of $CrSO_4$ salt) was added to the solution to make up the concentration of the trivalent chromium cation lost during the ion exchange process. This panel looked very similar to a panel plated with a fresh solution.

It is believed that the defects on the first panel were due to the use of the regenerated solution in which no chromium cation was made up for initial losses during the initial pass through the ion exchange column. During the initial pass a fixed amount of $Cr^{+3}$ is believed to be retained in the column. This was confirmed in Example 2 below.

EXAMPLE 2

Example 1 was repeated using the same column in Example I with 500 milliliters of the same doped solution. The column was loaded with trivalent chrome cation from Example 1. This was conducted to see if the trivalent chromium was reduced by adsorption on the resin and not by simple deletion. The treatment was run according to the same process as Example 1. A second passage of effluent was made through the resin during which apparently desorbed nickel and zinc from the column. Results of the first treated concentration and second pass are presented in Table II below:

TABLE II

| CATION | INITIAL CONC. (PPM) | TREATED CONC. (PPM) | 2nd. PASS |
|---|---|---|---|
| Ca | 54 | 0.3 | 0.3 |
| Zn | 102 | 10 | 53 |
| Fe | 135 | 60 | 38 |
| Ni | 230 | 2.1 | 20 |
| Cr | 20000 | 20000 | |

This Example confirmed that no additional chrome was retained on the resin. The second pass however, suggests that the resin should be regenerated. The column was regenerated with 200 milliliters of 6 percent by volume $H_2SO_4$ at a rate of 40 milliliters per hour, and rinsed with 400 milliliters of distilled water.

EXAMPLE 3

Example 1 was repeated using the regenerated resin of Example 2 with the results shown in Table III.

TABLE III

| CATION | INITIAL CONC. (PPM) | TREATED CONC. (PPM) |
|---|---|---|
| Cu | 55 | 0.3 |
| Zn | 100 | 10.5 |
| Fe | 135 | 65 |
| Ni | 230 | 23 |
| Cr | 20000 | 20000 |

A panel was run using the regenerated chromium plating bath of Example 2 and had very similar results as a panel using a virgin solution. There was a slight reduction in coverage of the chrome deposit (throw).

In Examples 1–3 the ion exchange resin used effectively removed cations of copper, nickel, and zinc, with some reduction also of iron. This believed due to the removal of ferrous ions formed by reduction of the ferric ions during processing. The trivalent chromium cation did not appear to be removed at all. The column was easily regenerated and effectively reused.

Literature relating to the TP-207 ion exchange resin recommends different pH limits to remove various cations. The values (as lower limits) include a pH of 3 to remove iron, a pH of 2.7 to remove zinc, a pH of 2.5 to remove nickel and a pH of 1.5 to remove copper. These limits are close to the chromium plating bath solution which was about 3.2 and may explain the best affinity for copper and the least affinity for iron ions. However, this is preferred since it is desirable to have from 50–100, and preferably, from 75–90 parts per million of iron ($Fe^{+3}$) in the plating bath solution. Therefore, by controlling the pH of the solution, the amount of iron ($Fe^{+3}$) remaining in the solution can be effectively controlled and maintained.

EXAMPLE 4

An example was run to determine the long term stability of the ion exchange resin TP-207 when in contact with the trivalent chromium plating bath. Similar doped solution concentrations were used as in Example 1. 100 cubic centimeters of the TP-207 cation exchange resin was converted to acid form with 200 milliliters of 6 percent by volume of $H_2SO_4$ and washed with 400 milliliters of distilled water. The resin was added to 1 liter of the chromium plating bath composition as recited in Example 1. The resin was allowed to sink to the bottom of a bottle and this bottle was inverted every one and a half hours during the working hours for ten days. The solution was then decanted to recover the 100 cubic centimeters of resin which was regenerated with 200 milliliters at 6 percent $H_2SO_4$ and washed with 100 milliliters of water.

Example 1 was then repeated. Results are reported in Table IV for the solution used in the stability test (STABILITY TEST SOL'N), as well as for a run (TREATED CONC) to deionize the same solution which was not used for the stability test.

TABLE IV

| CATION | INITIAL CONC. (PPM) | STABILITY TEST SOL'N (PPM) | TREATED CONC. (PPM) |
|---|---|---|---|
| Cu | 55 | 0.3 | 0.3 |
| Zn | 100 | 26 | 8.4 |
| Fe | 140 | 90 | 31 |
| Ni | 240 | 30 | 100 |

The treated material (TREATED CONC) was then run through the ion exchange bed for a second pass and the nickel content was measured at 43 parts per million. This second pass material was used as a chromium plating bath solution. A sample plate was plated and some dark streaking in all current densities (areas along the panel), and a dark horizontal band at the air solution interface was noted. This is believed to result from the concentration of nickel which was measured at 43 parts per million. However, these results were an improvement over a solution loaded with impurities (INITIAL CONC).

The cation exchange resin therefore shows good stability when in contact with a chromium plating bath and can be used for purification just as effectively after prolonged contact with the resin.

EXAMPLE 5

The same type of solution as used in Example 1 was contaminated with 100 parts per million zinc; 220 parts per million nickel; 50 parts per million copper; and 160 parts per million of iron cations. This was done using the sulfate salts of the copper, zinc, nickel and 0.4 weight percent of a soluble iron slit ($FeSO_4$).

This solution was used to plate a panel. The panel was plated in a 534 milliliter Null cell after being previously plated with bright nickel. There was a severe black powdery deposit from 0 to 15 millimeters from the high current density end, intermittent black powder from 15 to 40 millimeters and a black vertical band from 55–70 millimeters. One small area approximately 1.54 cm (1 inch) wide of relatively clear chrome plate existed in the high to mid current densities (40–55 mm). The collected solution had an average temperature of 80° C. throughout the run. The pH after treatment was 2.8 subsequently raised to 2.9 for plating. The above first panel was unsatisfactory using the unregenerated solution.

The contaminated solution was run through 100 cubic centimeters column of TP-207 cation exchanger resin at a flow rate of 400 milliliters per hour. The column had been freshly regenerated and rinsed with 400 milliliters of tap water at 100° C. The pH of the solution going into the column was measured at 2.9, at a temperature of 110° F. This was to prevent the column from cooling to below the plating bath conditions, typically, 85°–90° F. to prevent boric acid from precipitating in the column.

The first 15 milliliters of eluent was discarded, and approximately 50 milliliters of water remained in the column after rinsing so that 450 milliliters was collected. A panel using this regenerated solution was plated and was free of black powdery deposits, had no dark streaks, though a dirk horizontal band existed in the high concentration density (HCD) sir-solution interface area. This is typical of nickel contamination The cut area shows dark patches of chrome, open nickel and coverage (throw) was about 5 millimeters less than a virgin chrome solution. Overall the color was slightly darker than using the virgin solution. No precipitation of boric acid was seen throughout the procedure; boric acid and chrome were analyzed to determine any losses. Table V summarizes the results of the regeneration of the chromium bath of this Example.

TABLE V

| CATION CONC. | INITIAL CONC. (PPM) | TREATED (PPM) |
|---|---|---|
| Cu | 50 | 0 |
| Fe | 130 | 55 |
| Zn | 98 | 5.8 |
| Ni | 230 | 110 |
| Cr | 29000 | 23000 |

Boric acid remained substantially constant dropping 3 percent. Even after the precaution of discarding the first 50 milliliters of eluent, the chrome content dropped 11 percent.

EXAMPLE 6

Example 5 was repeated to determine whether there was a loss of chromium cation or just a dilution. This run repeated Example 5 using the column had already loaded with the initial chrome bath run. The chrome analysis by atomic absorption indicated that the initial concentration was 23000 parts per million and decreased to 22500 parts per million consistent with the above results. The boric acid remained relatively constant, being measured at 61.03 grams per liter before and 60.80 after treatment.

While exemplary embodiments of the invention have been described, the true scope of the invention is to be determined from the following claims.

What is claimed is:

1. In the process to regenerate a plating bath comprising a plating tank having therein trivalent chromium cations and containing contaminating amounts of hexavalent chromium ion, which comprises the steps of contacting the bath with a cationic ion-exchange resin to regenerate the bath, and recycling the regenerated plating bath to the plating tank, the improvement which comprises the ion-exchange resin being substantially selective to exchange metal cations, and less selective for trivalent chromium cations than for hexavalent chromium cations, and the cationic exchange resin being substantially stable upon exposure to the plating bath.

2. The process of claim 1 further comprising the step of periodically regenerating the ion-exchange resin.

3. The process as recited in claim 1 further comprising the steps of:

plating at least one article in a plating tank containing the trivalent chromium plating bath; and passing the bath from the tank to a bed comprising a cationic exchange resin.

4. The process as recited in claim 1 wherein the bath is continuously contacted with the cationic exchange resin.

5. The process as recited in claim 1 wherein the bath is periodically contacted with the cationic exchange resin.

6. The process as recited in claim 1 wherein the cationic exchange resin is a polymer comprising a functionalized styrenic backbone.

7. The process as recited in claim 1 wherein the pH of the plating bath is from 1.0 to 5.0.

*8. A method for removing hexavalent chromium cations from a bath comprising trivalent chromium cations and hexavalent chromium cations comprising the step of contacting said bath with an ion exchange resin that selectively removes metallic cations including said hexavalent chromium cations, and wherein said resin is substantially stable upon exposure to said bath.*

*9. The method of claim 8, wherein said bath further comprises metallic impurities.*

*10. The method of claim 9, wherein said metallic impurities are removed from said bath by said ion exchange resin.*

*11. The method of claim 8, wherein said ion exchange resin is a cation exchange resin.*

*12. The method of claim 11, wherein said cation exchange resin selectively removes divalent metallic cations.*

*13. The method of claim 8, wherein said bath is a plating bath.*

*14. The method of claim 8, wherein said ion exchange resin is a polystyrene based cationic exchange resin having at least one acidic functional group.*

*15. The method of claim 14, wherein said acidic functional group is an iminodiacetate functional group.*

*16. The method of claim 8, wherein said ion exchange resin is a resin in the hydrogen or sodium ion form.*

*17. The method of claim 8, further comprising the step of regenerating the resin with acid after said contacting step.*

*18. A method for removing at least one metallic cation impurity from a bath comprising trivalent chromium cations comprising the step of contacting said bath with an ion exchange resin that selectively removes said metallic cation impurity, and wherein said resin is substantially stable upon exposure to said bath.*

*19. The method of claim 18, wherein said metallic cation impurity is hexavalent chromium cations.*

*20. The method of claim 18, wherein said metallic impurity comprises at least metallic impurity selected from the group consisting of zinc cations, copper cations, nickel cations, iron cations, lead cations, manganese cations, and cobalt cations.*

*21. The method of claim 18, wherein said ion exchange resin is a cation exchange resin.*

*22. The method of claim 18, wherein said ion exchange resin is a resin in the hydrogen or sodium ion form.*

*23. The method of claim 18, further comprising the step of regenerating the resin with acid after said contacting step.*

*24. A method for removing at least one metallic cation impurity from a bath comprising trivalent chromium cations comprising the step of contacting said bath with a cation exchange resin that is capable of selectively removing hexavalent chromium cations, and wherein said resin is substantially stable upon exposure to said bath.*

*25. The method of claim 24, wherein said metallic cation impurity is hexavalent chromium cations.*

*26. The method of claim 24, wherein said metallic impurity comprises at least metallic impurity selected from the group consisting of zinc cations, copper cations, nickel cations, iron cations, lead cations, manganese cations, and cobalt cations.*

*27. The method of claim 24, wherein said bath is a plating bath.*

*28. The method of claim 24, wherein said ion exchange resin is a polystyrene based cationic exchange resin having at least one acidic functional group.*

*29. The method of claim 24, wherein said ion exchange resin is a resin in the hydrogen or sodium ion form.*

*30. The method of claim 24, further comprising the step of regenerating the resin with acid after said contacting step.*

* * * * *